(12) United States Patent
Ryu et al.

(10) Patent No.: US 12,261,391 B2
(45) Date of Patent: Mar. 25, 2025

(54) SERIAL CONNECTION APPARATUS, AND BATTERY CHARGE/DISCHARGE SYSTEM INCLUDING THE SAME

(71) Applicant: LG ENERGY SOLUTION, LTD., Seoul (KR)

(72) Inventors: Jeong-Hun Ryu, Daejeon (KR); Duk-You Kim, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 0 days.

(21) Appl. No.: 18/768,943

(22) Filed: Jul. 10, 2024

(65) Prior Publication Data
US 2025/0023287 A1    Jan. 16, 2025

(30) Foreign Application Priority Data

Jul. 10, 2023  (KR) .......................... 10-2023-0089289
Jul. 4, 2024   (KR) .......................... 10-2024-0088480

(51) Int. Cl.
*H01R 13/514*    (2006.01)
*H01R 13/24*     (2006.01)
*H02J 7/00*      (2006.01)

(52) U.S. Cl.
CPC ....... *H01R 13/514* (2013.01); *H01R 13/2421* (2013.01); *H02J 7/0045* (2013.01)

(58) Field of Classification Search
CPC ...... H01R 13/46; H01R 13/50; H01R 13/502; H01R 13/514; H01R 13/22; H01R 13/24;
(Continued)

(56) References Cited

U.S. PATENT DOCUMENTS

2015/0380959 A1   12/2015  Chang et al.
2020/0244073 A1    7/2020  Yip
(Continued)

FOREIGN PATENT DOCUMENTS

CN    209487635 U   10/2019
CN    216672632 U    6/2022
(Continued)

*Primary Examiner* — Khiem M Nguyen
(74) *Attorney, Agent, or Firm* — Bryan Cave Leighton Paisner LLP

(57) ABSTRACT

A serial connection apparatus includes a connector group including first to $m^{th}$ connector modules, each of which includes a first connector and a second connector, and a wire bundle. The first connector of the first connector module is connected to a first power terminal of a charge/discharge unit. The second connector of the $m^{th}$ connector module is connected to a second power terminal of the charge/discharge unit. The second connector of a $j^{th}$ connector module (j is a natural number less than m) is connected to the first connector of a $(j+1)^{th}$ connector module via the wire bundle. When an $i^{th}$ cell slot (i is a natural number of m or less) is empty, the first connector of an $i^{th}$ connector module is electrically connected to the second connector of the $i^{th}$ connector module via the wire bundle.

17 Claims, 13 Drawing Sheets

(58) Field of Classification Search
CPC ... H01R 13/2407; H01R 13/2421; H02J 7/00; H02J 7/0042; H02J 7/0044; H02J 7/0045
USPC ........................................................ 439/500
See application file for complete search history.

(56) References Cited

U.S. PATENT DOCUMENTS

| | | |
|---|---|---|
| 2020/0280196 A1 | 9/2020 | Yip et al. |
| 2022/0021222 A1 | 1/2022 | Yip et al. |
| 2022/0029426 A1 | 1/2022 | Yip |
| 2022/0396175 A1* | 12/2022 | Kim ..................... B60L 58/18 |
| 2023/0216093 A1* | 7/2023 | Kim ..................... H01M 10/48 |
| | | 429/90 |

FOREIGN PATENT DOCUMENTS

| | | |
|---|---|---|
| JP | 202165099 A | 4/2021 |
| KR | 10-2429765 B1 | 8/2022 |
| KR | 102431931 B1 | 8/2022 |
| KR | 20220114173 A | 8/2022 |
| KR | 102499839 B1 | 2/2023 |

\* cited by examiner

SERIAL CONNECTION APPARATUS, AND BATTERY CHARGE/DISCHARGE SYSTEM INCLUDING THE SAME

CROSS-REFERENCE TO RELATED APPLICATIONS

This application is based on and claims priority from Korean Patent Application No. 10-2023-0089289, filed on Jul. 10, 2023 and Korean Patent Application No. 10-2024-0088480, filed on Jul. 4, 2024, with the Korean Intellectual Property Office, the disclosure of which is incorporated herein in its entirety by reference.

TECHNICAL FIELD

The present disclosure relates to a serial connection apparatus and a battery charge/discharge system including the serial connection apparatus.

BACKGROUND

Recently, as the demand for portable electronic products such as laptops, video cameras, and portable phones has rapidly increased, and as the development of electric vehicles, energy storage batteries, robots, and satellites has begun in earnest, research on repeatedly chargeable/dischargeable high-performance batteries is actively underway.

Currently commercialized batteries include, for example, nickel cadmium batteries, nickel hydrogen batteries, nickel zinc batteries, and lithium batteries. Among these, the lithium batteries are in the spotlight because of their advantages including almost no memory effect compared to the nickel-based batteries, free charging and discharging, very low self-discharging rate, and high energy density.

Battery cells need to undergo a formation process after manufacturing and prior to shipment. The battery formation process may be broadly divided into an aging process and a charge/discharge process. In the aging process, battery cells are stored for a predetermined period of time in an environment with a predetermined temperature and humidity, so that the electrolyte introduced into the battery cells is stabilized. In the charge/discharge process, charging and discharging of the battery cells are performed at least once each according to a predetermined schedule. Consequently, a solid electrolyte interphase (SEI) is formed on the surfaces of negative electrodes, and the performance of the battery cells is manifested.

Meanwhile, for the battery cell formation process, an efficient and stable battery charge/discharge system is required, and a large amount of research is being conducted for this purpose.

SUMMARY

The present disclosure was devised to solve the above problems, and provides a device that, without having multiple voltage sensors and multiple FETs that require control using electrical signals, uses a physical connection state that varies depending on whether each of the multiple cell slots provided in a cell holder is empty or occupied to provide a serial charge/discharge path for battery cells disposed in the occupied cell slots. There is also a battery charge/discharge system including the device.

Other objects and advantages of the present disclosure can be understood from the following description, and will be more clearly understood by practicing the present disclosure. In addition, it will be readily apparent that the objects and advantages of the present disclosure can be implemented by features set forth in the claims and combinations thereof.

A serial connection apparatus according to an aspect of the present disclosure includes: a connector group including first to $m^{th}$ connector modules (m is a natural number of 2 or more) provided on a one-to-one basis to first in $m^{th}$ cell slots provided in a cell holder, wherein each of the first to $m^{th}$ connector modules includes a first connector and a second connector; and a wire bundle electrically connected to the first to $m^{th}$ connector modules. The first connector of the first connector module is electrically connected to a first power terminal of a charge/discharge unit. The second connector of the $m^{th}$ connector module is electrically connected to a second power terminal of the charge/discharge unit. The second connector of a $j^{th}$ connector module (j is a natural number less than m) is electrically connected to the first connector of a $(j+1)^{th}$ connector module via the wire bundle. When an $i^{th}$ cell slot (i is a natural number of m or less) is empty without a battery cell disposed therein, the first connector of an $i^{th}$ connector module is configured to be electrically connected to the second connector of the $i^{th}$ connector module via the wire bundle. When the $i^{th}$ cell slot is occupied with a battery cell disposed therein, the first connector of the $i^{th}$ connector module is configured to be electrically connected to the first electrode terminal of the battery cell disposed in the $i^{th}$ cell slot, and the second connector of the $i^{th}$ connector module is configured to be electrically connected to the second electrode terminal of the battery cell disposed in the $i^{th}$ cell slot.

The first connector of the $i^{th}$ connector module may include: a first body having a first internal space; a first wire connecting member having one end that is inserted into the first internal space and the other end that is exposed outside the first body; a first cell connecting member having one end that is exposed outside the first body toward the cell holder and the other end that is inserted into the first internal space; a first elastic member disposed in the first internal space to be positioned between the first wire connecting member and the first cell connecting member; a first movable contact coupled to the first elastic member so as to be movable along an axial direction of the first internal space in accordance with deformation of the first elastic member; and a first fixed contact having one end that is fixed to a predetermined area of the first internal space and the other end that is exposed outside the first body. The first body may be a non-conductor. The first cell connecting member, the first fixed contact, the first elastic member, and the first movable contact, may be conductors.

The other end of the first wire connecting member of the first connector of the first connector module may be connected to the first power terminal of the charge/discharge unit. The other end of the first wire connecting member of the second connector of the $j^{th}$ connector module may be connected to the other end of the first wire connecting member of the first connector of the $(j+1)^{th}$ connector module via the wire bundle.

When the $j^{th}$ cell slot is in the empty state, the first movable contact of the first connector of the $j^{th}$ connector module may be brought into physical contact with the first fixed contact by the first elastic member to be electrically connected to the first fixed contact of the first connector of the $j^{th}$ connector module, and the first fixed contact of the first connector of the $j^{th}$ connector module may be electrically connected to the first wire connecting member of the first connector of the $(j+1)^{th}$ connector module via the wire bundle.

When the $m^{th}$ cell slot is in the empty state, the first movable contact of the first connector of the $m^{th}$ connector module may be brought into physical contact with the first fixed contact by the first elastic member to be electrically connected to the first fixed contact of the first connector of the $m^{th}$ connector module, and the first fixed contact of the first connector of the $m^{th}$ connector module may be electrically connected to the second power terminal of the charge/discharge unit via the wire bundle.

When the $i^{th}$ cell slot is in the occupied state, the first cell connecting member of the first connector of the $i^{th}$ connector module may be configured to come into physical contact with the first electrode terminal of the battery cell disposed in the $i^{th}$ cell slot to be electrically connected to the first electrode terminal of the battery cell, and the first movable contact of the first connector of the $i^{th}$ connector module may be configured to be physically spaced apart from the first fixed contact in accordance with the deformation of the first elastic member to be electrically separated from the first fixed contact of the first connector of the $i^{th}$ connector module.

The second connector of the $i^{th}$ connector module may include: a second body having a second internal space formed therein; a second wire connecting member having one end that is inserted into the second internal space and the other end that is exposed outside the second body; a second cell connecting member having one end that is exposed outside the second body toward the cell holder and the other end that is inserted into the second internal space; and a second elastic member disposed in the second internal space to be positioned between the second wire connecting member and the second cell connecting member. The first body may be a non-conductor. The second wire connecting member, the second cell connecting member, and the second elastic member may be conductors.

The second wire connecting member of the second connector of the $j^{th}$ connector module may be connected to the first fixed contact of the first connector of the $j^{th}$ connector module and the first wire connecting member of the first connector of the $(j+1)^{th}$ connector module via the wire bundle. The second wire connecting member of the second connector of the $m^{th}$ connector module may be connected to the first fixed contact of the first connector of the $m^{th}$ connector module and the second power terminal of the charge/discharge unit via the wire bundle.

When the $i^{th}$ cell slot is in the occupied state, the second cell connecting member of the second connector of the $i^{th}$ connector module may be configured to come into physical contact with the second electrode terminal of the battery cell disposed in the $i^{th}$ cell slot to be electrically connected to the second electrode terminal of the battery cell disposed in the $i^{th}$ cell slot.

The wire bundle may include first to $m^{th}$ bypass wires and first to $(m-1)^{th}$ cell connection wires. An $i^{th}$ bypass wire may electrically interconnect the first wire connecting member of the first connector of the $i^{th}$ connector module and the second wire connecting member of the second connector of the $i^{th}$ connector module. An $i^{th}$ cell connection wire may electrically connect the second wire connecting member of the second connector of the $i^{th}$ connector module to the first wire connecting member of the first connector of the $(i+1)^{th}$ connector module.

A serial connection apparatus according to another aspect of the present disclosure includes multiple connector modules corresponding one-to-one to multiple cell slots included in a cell holder. Each of the multiple connector modules includes a connector group including a first connector and a second connector. Among the multiple connector modules, the first connector and the second connector of each connector module corresponding to an empty cell slot, into which a battery cell is not inserted are configured to be automatically electrically connected to each other to form a bypass path. Among the multiple connector modules, the first connector and the second connector of each connector module corresponding to an occupied cell slot into which a battery cell is inserted, are configured to be individually connected to the first electrode and the second connector of the battery cell inserted into the occupied cell slot to provide a serial charge/discharge path.

The first connector includes a first body, a first wire connecting member, a first cell connecting member, a first elastic member, a first movable contact, and a first fixed contact. The first body is made of a non-conductor, has a circular pillar shape with opposite open ends in the Z-axis direction, and includes a first internal space.

The first wire connecting member has a portion located in the first internal space of the first body, and a remaining portion protrudes outside through one end of the first body, and the first cell connecting member has a portion located in the first internal space of the first body, and a remaining portion exposed outside the first body toward a predetermined cell slot of the lower cell holder.

The first elastic member is disposed in the first internal space to be positioned between the other end of the first wire connecting member and the other end of the first cell connecting member, such that the other end of the first wire connecting member and the other end of the first cell connecting member are electrically connected to each other, and the first movable contact is fixedly coupled to a predetermined portion of the first elastic member, and also reciprocates along the Z-axis direction in accordance with deformation of the first elastic member in the Z-axis direction.

The first fixed contact is made of a conductor and has one end fixed to a predetermined area of the first internal space and the other end exposed outside the first body, and a bypass wire is connected to the first wire connecting member protruding to the outside of the first body, and the first movable contact is connected to the first fixed contact at the predetermined portion, and as the first elastic member is deformed in the Z-axis direction in response to movement of the first cell connecting member in the Z-axis direction, the first movable contact also reciprocates in the Z-axis direction to be separated from the first fixed contact.

A battery charge/discharge system according to another aspect of the present disclosure includes the serial connection apparatus.

According to at least one of the embodiments of the present disclosure, using a physical connection state that varies depending on whether each of the multiple cell slots provided in a cell holder is an empty state or an occupied state, a serial charge/discharge path can be provided for battery cells disposed in the cell slots in the occupied state.

That is, since multiple voltage sensors and multiple field effect transistors (FETs) that require control using electrical signals are not required, the overall circuit structure can be simplified, volume and weight can be reduced, and costs for manufacturing, repair, and maintenance, are also reduced.

The effects of the present disclosure are not limited to those mentioned above, and other effects not mentioned above will be clearly understood by a person ordinarily skilled in the art from the description of the claims.

BRIEF DESCRIPTION OF THE DRAWINGS

The following drawings attached hereto exemplify embodiments of the present disclosure and serve to further understand the technical idea of the present disclosure together with the detailed description of the disclosure to be described later. Therefore, the present disclosure should not be construed as being limited to the matters illustrated in the drawings.

Figure 1:
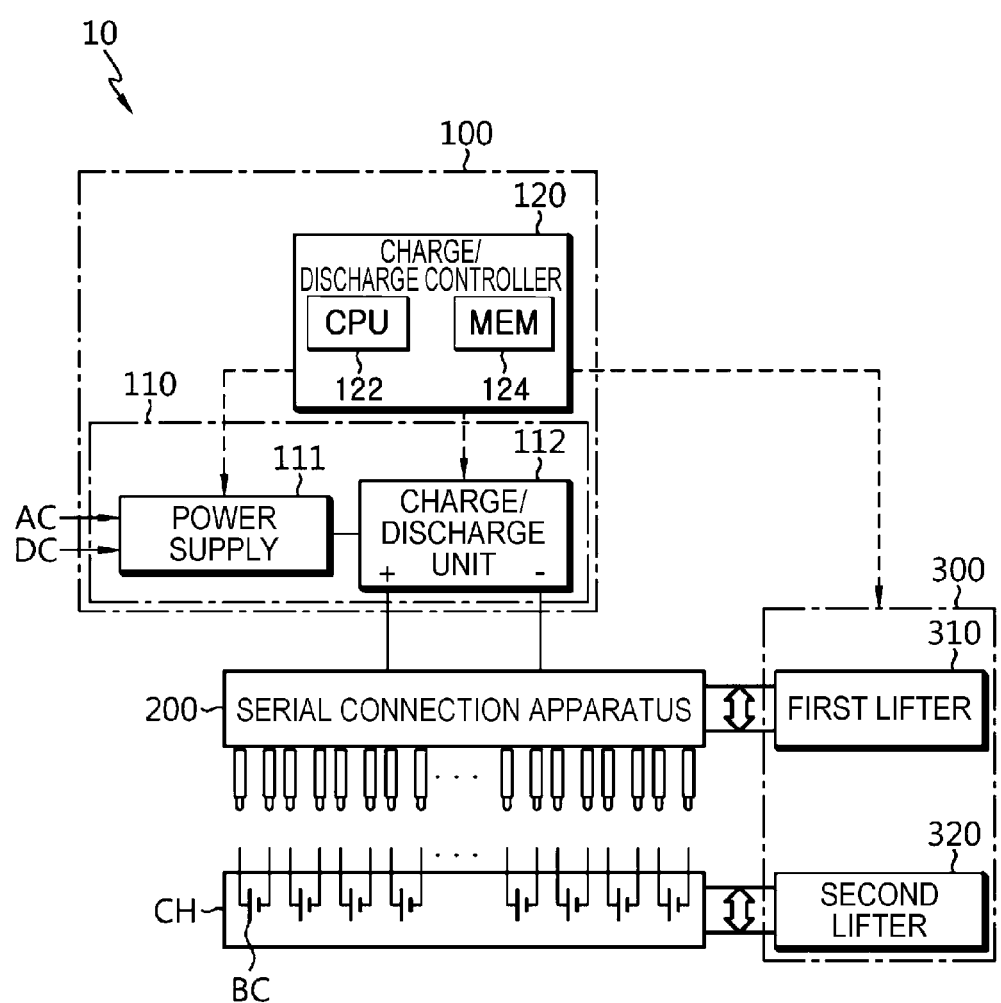
FIG. 1 is a view exemplarily illustrating the configuration of a battery charge/discharge system according to an embodiment of the present disclosure.

In some of the accompanying drawings, corresponding components are given the same reference numerals. A person ordinarily skilled in the art will appreciate that the drawings illustrate elements simply and clearly and are not necessarily drawn to scale. For example, in order to aid understanding of various embodiments, the dimensions of some elements illustrated in the drawings may be exaggerated compared to other elements. In addition, elements that are useful or essential in commercially implementable embodiments but are known in the art may often not be described in order to avoid impeding the understanding of the spirit of various embodiments of the present disclosure.

DETAILED DESCRIPTION

Hereinafter, embodiments of the present disclosure will be described in detail with reference to the attached drawings. Prior to this, the terms and words used in the specification and claims should not be construed as limited to their ordinary or dictionary meanings, but should be interpreted with meanings and concepts consistent with the technical idea of the present disclosure based on a principle that the inventor may appropriately define the concepts of terms in order to explain his or her invention in the best way.

Accordingly, since the embodiments described in this description and the configurations illustrated in the drawings are merely some exemplary embodiments of the present disclosure, and do not represent all the technical ideas of the present disclosure, it should be understood that at the time of filing the present application, there may be various equivalents and modifications that may replace the embodiments.

Terms containing ordinal numbers, such as first and second, are used for the purpose of distinguishing one of the various components from the rest, and are not used to limit the components by such terms.

Throughout the specification, when a part is described as "including" a certain component, this means that other elements are not excluded, but other components may be further included, unless specifically stated otherwise. In addition, terms such as "controller" described in the specification refer to a unit that processes at least one function or operation, and the controller may be implemented in hardware, software, or a combination of hardware and software.

In addition, throughout the specification, when a part is described as being "connected" to another part, this includes not only the case where the parts are "directly connected," but also the case where the parts are "indirectly connected" with another element interposed therebetween.

Since battery cells are manufactured in large quantities, in order to improve the efficiency of a charge/discharge process for formation, it is required to connect several to hundreds of battery cells in series and charge/discharge the battery cells simultaneously.

Figure 10:
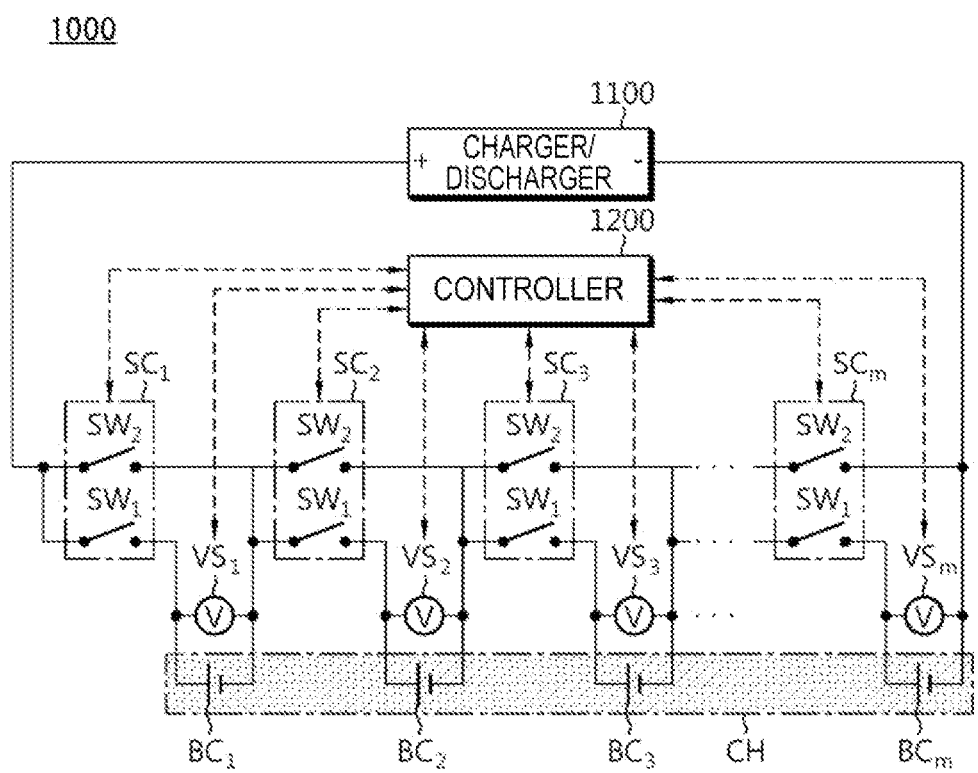
FIG. 10 is a view schematically illustrating the configuration of a battery charge/discharge system according to the prior art.

FIG. 10 is a view schematically illustrating a conventional battery charge/discharge system used in a battery formation process.

Referring to FIG. 10, a battery charge/discharge system 1000 is configured to charge/discharge multiple battery cells $BC_1$ to $BC_m$ (m is a natural number of 2 or more) disposed in a cell holder CH, and includes a charger/discharger 1100, multiple voltage sensors $VS_1$ to $VS_m$, multiple switching circuits $SC_1$ to $SC_m$, and a controller 1200. Assuming that i is a natural number less than or equal to m, a voltage sensor $VS_i$ and a switching circuit $SC_i$ are provided for a battery cell $BC_i$, and the switching circuit $SC_i$ includes a first FET $SW_1$ and a second FET $SW_2$. In the switching circuit $SC_i$, both the first FET $SW_1$ and the second FET $SW_2$ are not controlled simultaneously to be in the on state.

When the Battery cell $BC_i$ is normally inserted into an $i^{th}$ cell slot provided in the cell holder CH, the cell voltage, which is the voltage across the voltage sensor $VS_i$, is measured by a voltage sensor $VS_i$, and, in response to the fact that the voltage values collected from the voltage sensor $VS_i$ are within a predetermined voltage range, the controller 1200 may identify that the battery cell $BC_i$ is normally inserted and occupied in the $i^{th}$ cell slot. When it is determined that the battery cell $BC_i$ is normally inserted into the $i^{th}$ cell slot, the controller 1200 controls the first FET $SW_1$ of the switching circuit $SC_i$ to be in the on state and the second FET $SW_2$ to be in the off state.

When there is no battery cell inserted into the $i^{th}$ cell slot provided in the cell holder CH, that is, the battery cell $BC_i$ is not disposed in the cell holder CH, the voltage sensor $VS_i$ falls outside the above-mentioned voltage range, and accordingly, the controller 1200 may identify that the $i^{th}$ cell slot is empty. When it is identified that the battery cell $BC_i$ is not inserted into the $i^{th}$ cell slot, the controller 1200 controls the first FET $SW_1$ of the switching circuit $SC_i$ to be in the off state and the second FET $SW_2$ to be in the on state.

Accordingly, even when some of the multiple battery cells $BC_1$ to $BC_m$ are not inserted into the cell holder CH, the battery cells inserted into the cell holder CH are connected in series by the multiple switching circuits $SC_1$ to $SC_m$. A series connection of battery cells is electrically connected between a first power terminal (+) and a second power terminal (−) of the charger/discharger 1100 to enable charging and discharging.

When only the battery cell $BC_2$ is not input into the cell holder CH among the multiple battery cells $BC_1$ to $BC_m$, only the second FET $SW_2$ of the switching circuit $SC_2$ is controlled to be in the on state among the m second FETs $SW_2$ of the multiple switching circuits $SC_1$ to $SC_m$, and the first FETs $SW_1$ of the first switching circuit $SC_1$ and third to $m^{th}$ switching circuits $SC_3$ to $SC_m$) among the multiple switching circuits $SC_1$ to $SC_m$ are controlled to be in the on state. As a result, a series connection is formed of the remaining battery cells $BC_1$ and $BC_3$ to $BC_m$ excluding the battery cell $BC_2$ among the multiple battery cells $BC_1$ to $BC_m$. From this point of view, the first FETs $SW_1$ may be said to be provided for connection between two battery cells, and the second FETs $SW_2$ may be said to be provided for bypass, to replace non-inserted battery cells.

However, in the conventional battery charge/discharge system described above, since the multiple voltage sensors $VS_1$ to $VS_m$ and multiple switching circuits $SC_1$ to $SC_m$ are essentially required, there are problems in that the overall circuit structure is complex, the volume and weight increase, and the charge/discharge system is costly to manufacture, repair, and maintain.

Furthermore, since it is necessary to go through the process of identifying whether or not a battery cell is inserted into each cell slot of the cell holder CH through voltage measurement and the process of individually controlling the multiple switching circuits $SC_1$ to $SC_m$ according to the identification result, for example, there are limitations, such as the fact that it takes a significant time until charging and discharging of the battery cells of the cell holder CH is actually initiated.

Moreover, the voltage sensors VS, the first FETs $SW_1$, and second FETs $SW_2$ are electronic elements and should be electrically controlled by the controller 1200. However, due to the characteristics of electronic devices, there is a high possibility of operation errors.

FIG. 1 is a view illustrating the configuration of a battery charge/discharge system 10 according to an embodiment of the present disclosure.

Referring to FIG. 1, the battery charge/discharge system 10 is provided for a battery formation process and includes a charge/discharge facility 100 and a serial connection apparatus 200. The battery charge/discharge system 10 may further include a lifting device 300.

The charge/discharge facility 100 performs charge/discharge cycles for multiple battery cells $BC_1$ to $BC_m$ according to a predetermined charge/discharge schedule so that the multiple battery cells $BC_1$ to $BC_m$ can exhibit proper performance.

The charge/discharge facility 100 has a charging function, a discharging function, and a pause function, and is configured to selectively execute one of the charging function, the discharging function, and the pause function according to the charge/discharge schedule, and to charge and discharge the multiple battery cells $BC_1$ to $BC_m$ based on control parameters (e.g., charge voltage, charge current, discharge voltage, and discharge current) preset for each charge/discharge stage. Here, the battery cell BC is not particularly limited in type as long as it can be repeatedly charged and discharged like a lithium ion cell. In addition, the battery cell BC may be a cylindrical cell in which the first electrode terminal and the second electrode terminal are exposed in the same direction to facilitate physical contact connectors can and $CN_B$, which will be described later. Meanwhile, the first and second electrode terminals of the battery cell BC may not be exposed in the same direction. In this case, a connector which may come into contact with the battery cell BC may be transformed into an appropriate structure for physical contact with and separation from the exposed electrode terminals of the battery cell BC.

The charge/discharge facility 100 includes a charger/discharger 110 and a charge/discharge controller 120.

The charger/discharger 110 includes a power supply 111 and a charge/discharge unit 112.

According to an embodiment, the power supply 111 is configured to convert power supplied from an AC power supply and/or a DC power supply into direct current, having a predetermined voltage level that meets the input specifications of the charge/discharge unit 112. One or a combination of a known AC-DC converter and DC-DC converter may be used as the power supply 111.

The charge/discharge unit 112 has a pair of charge/discharge terminals provided therein, that include, first and second power terminals (+, −), which may be connected to the positive and negative electrodes of a battery cell BC, respectively, and charge or discharge the battery cell BC in response to a command from the charge/discharge controller 120. According to an embodiment, one or a combination of two of a known DC-DC converter, constant current circuit, and constant voltage circuit may be used as the charge/discharge unit 112.

The charge/discharge controller 120 stores in advance, for example, a program capable of executing a charge/discharge schedule in memory 124 mounted therein. In response to user input, the charge/discharge controller 120 executes the program recorded in the memory 124 by the processor (CPU) 122 according to the charge/discharge schedule to proceed with a charge/discharge cycle, and controls the charger/discharger 110 such that each charge/discharge stage of the charge/discharge cycle is sequentially performed according to a predetermined proceeding order.

The charge/discharge cycle may be defined as a sequential flow of, for example, a first charge stage (e.g., constant current (CC)-constant voltage (CV) charging), a first pause stage, a discharge stage (e.g., constant current (CC) discharging), a second pause stage, and a secondary charge stage (e.g., CC-CV charging). Since the charge/discharge cycle for battery formation is widely known, a detailed description thereof will be omitted. In the first pause stage, the pause function of the charge/discharge unit 112 may be activated for a predetermined first pause time, and in the second pause stage, the pause function of the charge/discharge unit 112 may be activated for a predetermined second pause time.

The serial connection apparatus 200 is configured to electrically connect the battery cells BC inserted into a cell holder CH to form a series connection of battery cells BC, and to electrically connect the series connection to the charger/discharger 110.

The lifting device 300 includes at least one of a first lifter 310 and a second lifter 320.

According to an embodiment, when the serial connection apparatus 200 is seated or coupled to the first lifter 310, the first lifter 310 may raise or lower the serial connection apparatus 200 along a predetermined direction (the Z-axis) to adjust the distance between the cell holder CH and the serial connection apparatus 200.

In addition, when the cell holder CH is seated or coupled to the second lifter 320, the second lifter 320 may raise or lower the cell holder CH along a predetermined direction (the Z-axis) to change the contact state between the cell holder CH and the serial connection apparatus 200.

Figure 2A:
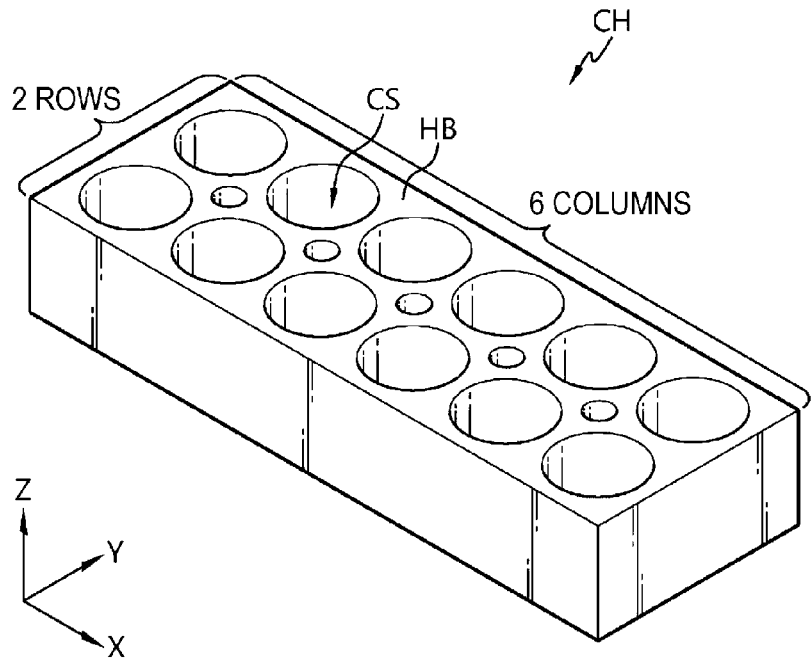
FIG. 2A is a view exemplarily illustrating the structure of the cell holder illustrated in FIG. 1.
Figure 2B:
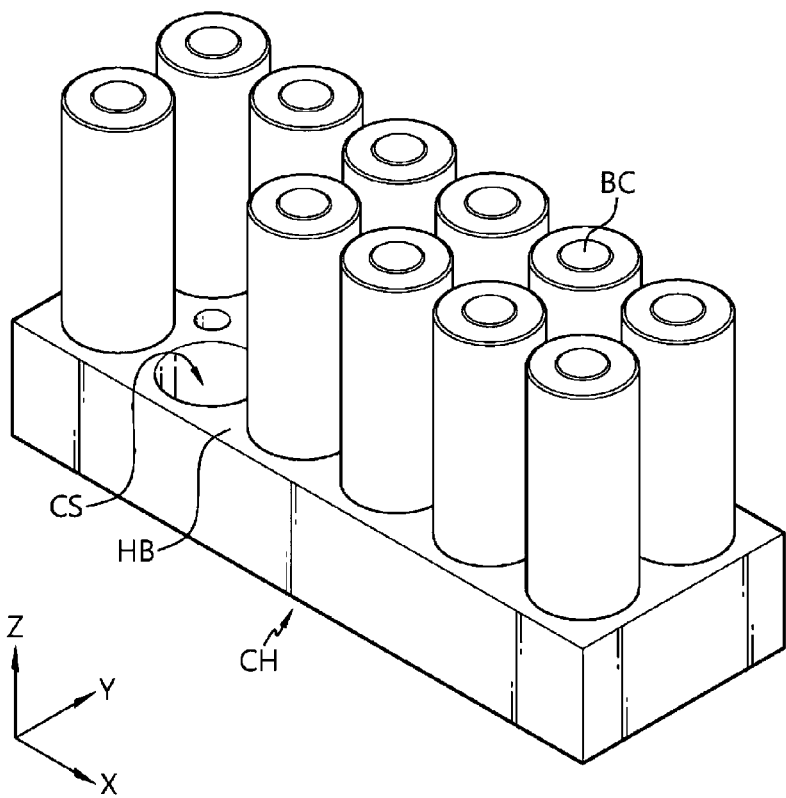
FIG. 2B is a view exemplarily illustrating a state where battery cells are inserted into the cell slots of the cell holder illustrated in FIG. 2A.

FIG. 2A is a view illustrating the structure of the cell holder CH illustrated in FIG. 1, and FIG. 2B is a view exemplarily illustrating battery cells inserted into cell slots of the cell holder illustrated in FIG. 2A.

Referring to FIGS. 2A and 2B, the cell holder CH includes a support body HB and multiple cell slots CS.

The plurality of cell slots CS may be portions recessed or open in a support body HB such that the battery cells BC can be partially accommodated and supported.

To aid understanding, FIG. 2A exemplifies a cell holder CH in which a total of 12 cell slots CS are arranged in 2 rows and 6 columns according to an embodiment. Since one battery cell BC can be inserted into each cell slot CS, up to 12 battery cells BC can be disposed in the cell holder CH of FIG. 2 as objects of serial connection by the serial connection apparatus 200.

In relation to this, the task of placing (inserting) the battery cells BC into the cell slots CS may be performed manually by an operator or automatically by, for example, a robot. Due to, for example, operator error or robot operation error, a situation may occur in which the cell holder CH is transferred to a battery charge/discharge system 10 while the battery cells BC are not inserted into one or more cell slots CS among the multiple cell slots CS. FIG. 2B exemplifies that, among the 12 cell slots CS of the cell holder CH, only one specific cell slot CS is empty, and the remaining 11 cell slots CS are occupied.

Referring to FIGS. 1, 2A, and 2B, the first lifter 310 and the second lifter 320 of the lifting device 300 face each other along the Z-axis direction. According to an embodiment, the cell holder CH is exemplified as being coupled to the lower portion of a support surface provided in the first lifter 310, and the serial connection apparatus 200 is coupled to the upper portion of a support surface provided in the second lifter 320. Meanwhile, the positions of the first lifter 310 and the second lifter 320 of the lifting device 300 may be changed depending on needs and situations.

In addition, the lifting device 300 may include only one of the first lifter 310 and the second lifter 320. For example, when the lifting device includes only the first lifter 310, the cell holder CH may be placed in a predetermined area below the first lifter 310. Alternatively, for example, when the lifting device 300 includes only the second lifter 320, the serial connection apparatus 200 may be located in a predetermined area above the second lifter 320.

The charge/discharge controller 120 may operate in a charge/discharge standby mode or a charge/discharge execution mode, and may control the lifting device 300 accordingly. According to an embodiment, in the lifting device 300, the raising and lowering operation of each of the first lifter 310 and the second lifter 320 may be implemented by, for example, a piston or a step motor.

When the lifting device 300 includes both the first lifter 310 and the second lifter 320, in the charge/discharge standby mode, the first lifter 310 raises the serial connection apparatus 200 and the second lifter 320 lowers the cell holder CH so that the cell holder CH and the serial connection apparatus 200 are spaced apart from each other along the Z-axis direction. In addition, in the charge/discharge execution mode, the first lifter 310 lowers the serial connection apparatus 200 and the second lifter 320 raises the cell holder CH such that the cell holder CH and the serial connection apparatus 200 come into physical contact with each other. According to an embodiment, the raising and lowering amounts of the first lifter 310 and the second lifter 320 in the charge/discharge standby mode and the charge/discharge execution mode are preprogrammed. However, without being limited thereto, the raising and lowering amounts of each of the first lifter 310 and the second lifter 320 may be adjusted, for example, according to a user input.

When the lifting device 300 includes only the first lifter 310 and the second lifter 320, in the charge/discharge standby mode, the first lifter 310 raises the serial connection apparatus 200 such that the cell holder CH and the serial connection apparatus 200 are spaced apart from each other along the Z-axis direction. In addition, in the charge/discharge execution mode, the first lifter 310 lowers the serial connection apparatus 200 such that the cell holder CH and the serial connection apparatus 200 come into physical contact with each other. The raising and lowering amounts of the first lifter 310 in the charge/discharge execution mode and the charge/discharge execution mode are preprogrammed. Without being limited thereto, however, the raising and lowering amounts of the first lifter 310 may be adjusted according to, for example, a user input.

When the lifting device 300 includes only the second lifter 320 of the first lifter 310 and the second lifter 320, in the charge/discharge standby mode, the second lifter 330 lowers the cell holder CH such that the cell holder CH and the serial connection apparatus 200 are spaced apart from each other along the Z-axis direction. In addition, in the charge/discharge execution mode, the second lifter 320 raises the serial connection apparatus 200, such that the cell holder CH and the serial connection apparatus 200 come into physical contact with each other. The raising and lowering amounts of the second lifter 320 in the charge/discharge execution mode and the charge/discharge execution mode are preprogrammed. Without being limited thereto, however, the raising and lowering amounts of the second lifter 320 may be adjusted according to, for example, a user input.

Figure 3:
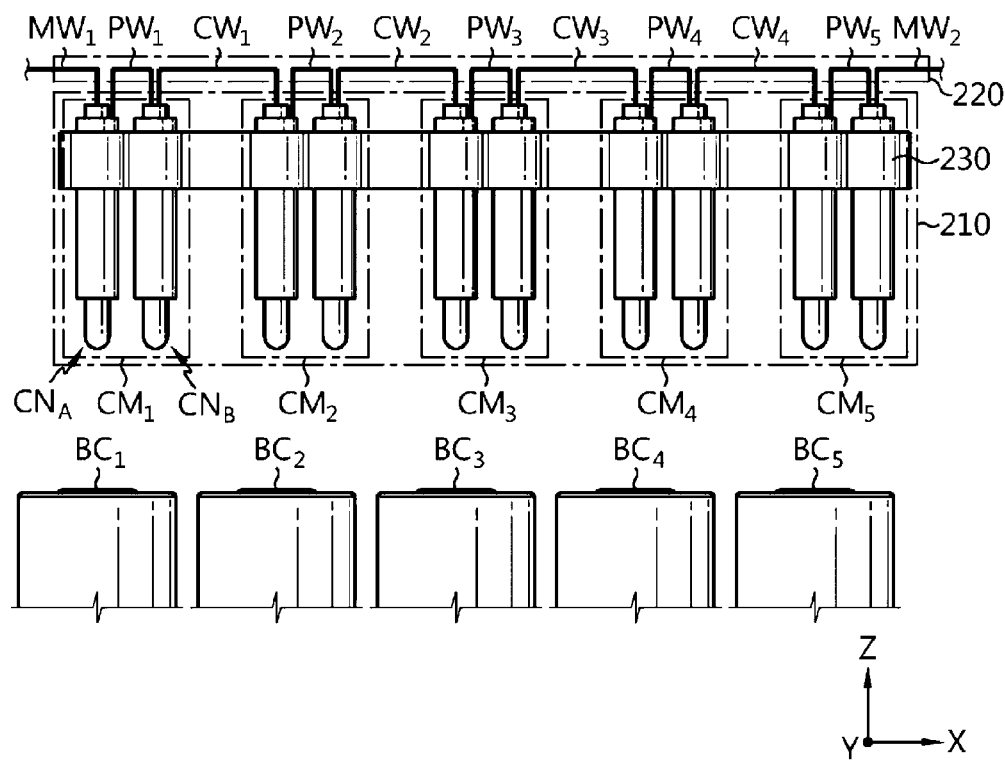
FIG. 3 is a view referenced for exemplarily explaining the configuration of the serial connection apparatus illustrated in FIG. 1.

FIG. 3 is a viewed referenced for exemplarily explaining the configuration of the serial connection apparatus 200 illustrated in FIG. 1. In FIG. 3, it is assumed that m is 5 according to an embodiment.

Referring to FIG. 3, the serial connection apparatus 200 includes a connector group 210 and a wire bundle 220.

The connector group 210 includes first to $m^{th}$ connector module $CM_1$ to $CM_m$. According to an embodiment, the number of connector modules CM included in the connector group 210 may be equal to the number of cell slots CS provided in the cell holder CH. The $1^{st}$ to $m^{th}$ connector modules $CM_1$ to $CM_m$ each include a first connector $CN_A$ and a second connector $CN_B$.

The wire bundle 220 is provided to be fixedly coupled to a predetermined portion of each of the first to $m^{th}$ connector modules $CM_1$ to $CM_m$ to support the first to $m^{th}$ connector modules $CM_1$ to $CM_m$. In addition, the wire bundle 220 is configured to mediate electrical connection among the first to $m^{th}$ connector modules $CM_1$ to $CM_m$ via multiple electric wires provided therein.

The wire bundle 220 includes first to $(m-1)^{th}$ cell connection wires $CW_1$ to $CW_{m-1}$ for inter-cell connection and first to $m^{th}$ bypass wires $PW_1$ to $PW_m$. The wire bundle 220 further includes a first main wire $MW_1$ and a second main wire $MW_2$ for connection to the charge/discharge unit 112 of the charge/discharge facility 100.

It is assumed that j is a natural number less than m, and i is a natural number less than or equal to m.

According to one embodiment, a cell connection wire $CW_j$ electrically connects the second wire connecting member 61 (see FIGS. 5A, 5B, and 5C) of the second connector $CN_B$ of a connector module $CM_j$ to the first wire connecting member 51 (see FIGS. 4A, 4B, and 4C) of the first connector CAN of a connector module $CM_{j+1}$, which is an adjacent connector module.

A bypass wire $PW_i$ electrically interconnects the first wire connecting member 51 of the first connector $CN_A$ and the second wire connecting member 61 of a second connector $CN_B$ of a connector module $CM_i$.

The first main wire $MW_1$ electrically connects the first connector $CN_A$ of the connector module $CM_1$ to a first power terminal (+) of the charge/discharge unit 112.

The second main wire $MW_2$ electrically connects the second connector $CN_B$ of the connector module $CM_m$ to a second power terminal (−) of the charge/discharge unit 112.

The serial connection apparatus 200 may further include a connector holder 230. According to an embodiment, the connector holder 230 may have 2 m through holes. The first connector $CN_A$ and the second connector $CN_B$ of each of the first to $m^{th}$ connector modules $CM_1$ to $CM_m$ can be inserted into the 2 m through holes provided in the connector holder 230. Accordingly, all of the connectors of the connector group 210 can be stably supported by the connector holder 230.

According to an embodiment, the connector holder 230 may be mechanically coupled to the first lifter 310. That is, the first lifter 310 may raise or lower the connector holder 230 along the Z-axis, and as a result, each connector of the connector group 210 and each battery cell of the cell holder CH may be brought into physical contact with each other or separated from each other.

Meanwhile, FIG. 3 illustrates that the connector holder 230 supports the side surface of each connector, which should be understood as an example. For example, the connector holder 230 may be located above each connector in the Z-axis, and the Z-axis end of each connector may be fitted to the connector holder 230, coupled to the connector holder 230 with a bolt, or bonded to the connector holder 230 with an adhesive.

In addition, the connector holder 230 may have a separate internal space that accommodates the wire bundle 220.

Figure 4A:
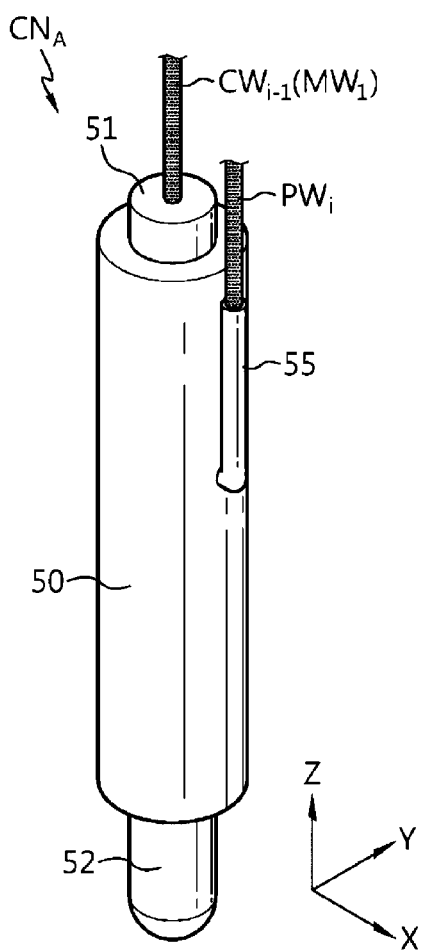
FIG. 4A is a view exemplifying the external appearance of the first connector of the connector module illustrated in FIG. 3.
Figure 4B:
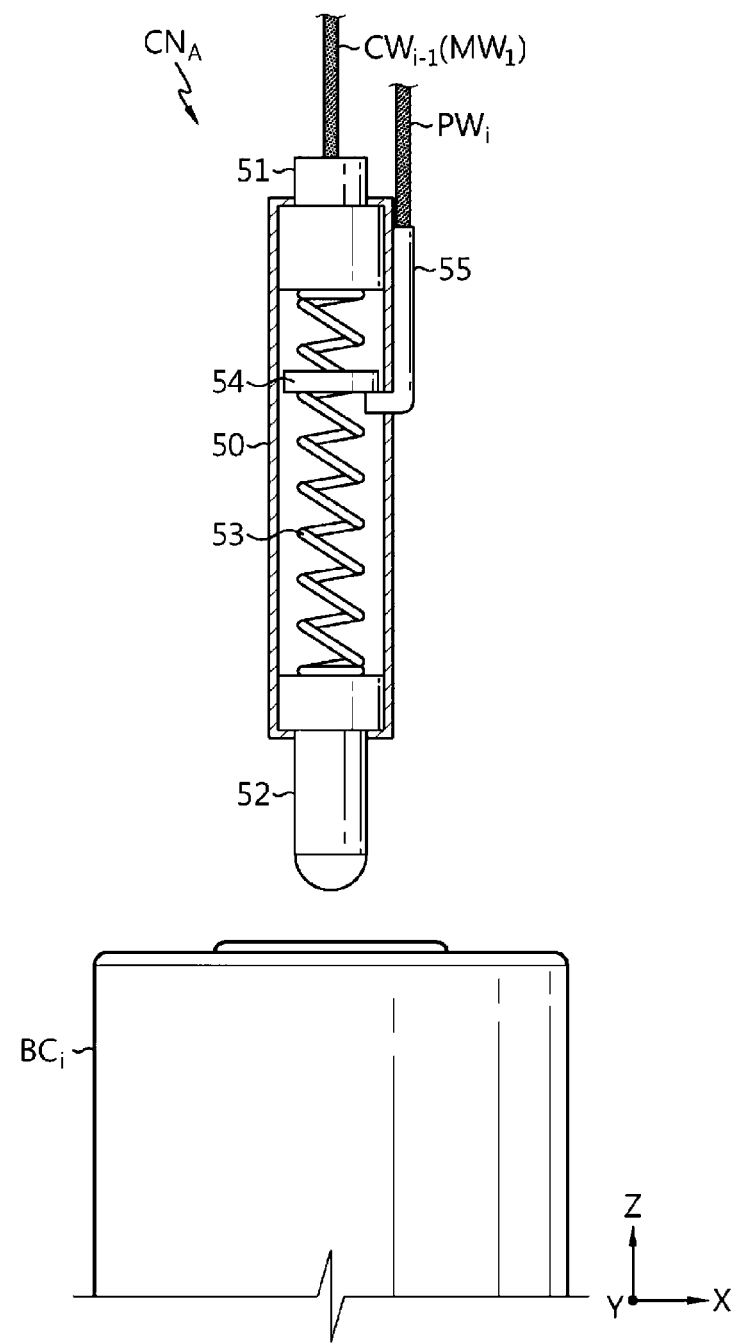
FIG. 4B is a view exemplifying the internal appearance of the first connector illustrated in FIG. 4A in a charge/discharge standby mode.
Figure 4C:
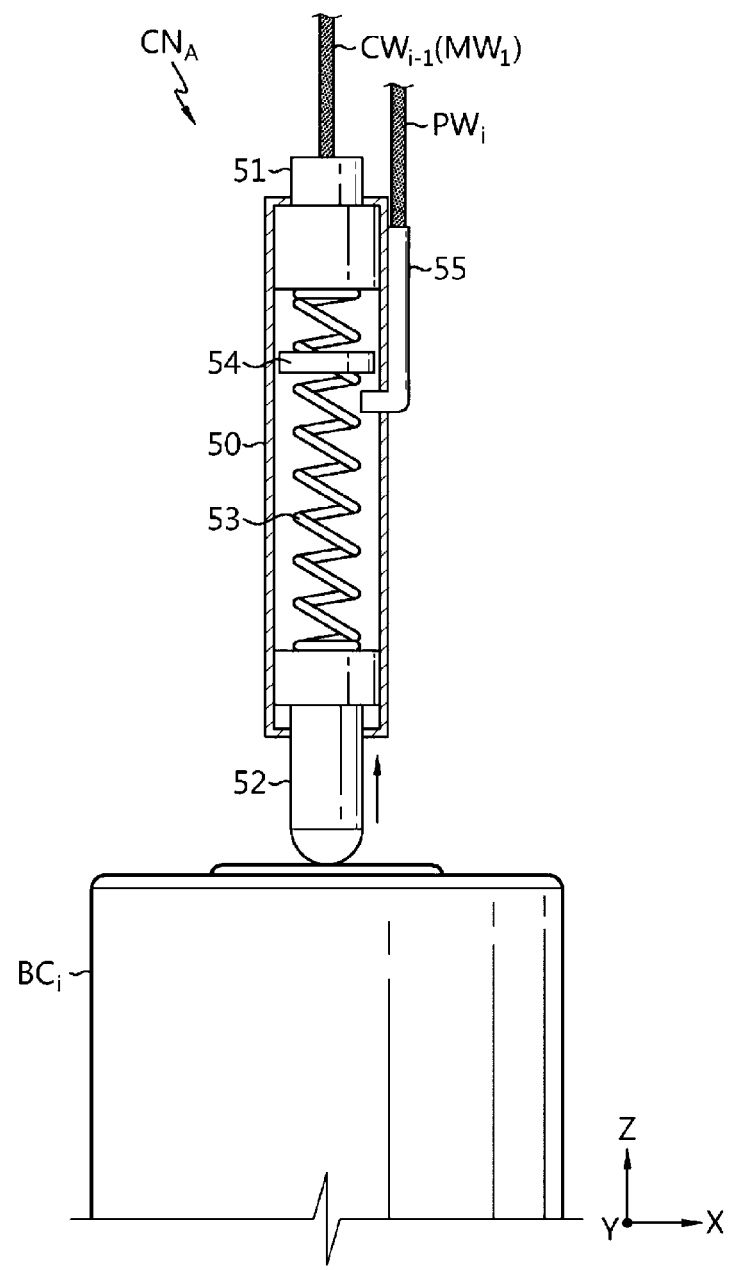
FIG. 4C is a view exemplifying the internal appearance of the first connector illustrated in FIG. 4A in a charge/discharge execution mode.

FIG. 4A is a view exemplifying the external appearance of the first connector of a connector module illustrated in FIG. 3 according to an embodiment of the present disclosure. FIG. 4B is a view exemplifying the internal appearance of the first connector illustrated in FIG. 4A in a charge/discharge standby mode, and FIG. 4C is a view exemplifying the internal appearance of the first connector illustrated in FIG. 4A in a charge/discharge execution mode. For convenience of explanation, it is assumed that the first connector $CN_A$ illustrated in FIGS. 4A to 4C belongs to the connector module $CM_i$.

Referring to FIGS. 4A and 4B along with FIG. 3, the first connector $CN_A$ includes a first body 50, a wire connecting member 51, a first cell connecting member 52, a first elastic member 53, a first movable contact 54, and a first fixed contact 55.

According to an embodiment, the first body 50 is made of a non-conductor, has a circular pillar shape with opposite open ends in the Z-axis direction, and has a first internal space.

The first wire connecting member 51 is made of a conductor, in which a portion of the first wire connecting member is located in the first internal space of the first body 50, and the remaining portion protrudes to the outside through one end of the first body 50. For example, one end of the first wire connecting member 51 is inserted into the first internal space, and the other end is exposed to the outside of the first body 50.

When the first connector $CN_A$, illustrated in FIG. 4A, belongs to the first connector module $CM_1$ (i.e., i is 1), the first wire connecting member 51 protruding to the outside of the first body 50 is connected to the first main wire $MW_1$, by which the first wire connecting member 51 is electrically connected to, for example, the first power terminal (+) of the charge/discharge unit 112.

In the meantime, when the first connector $CN_A$ illustrated in FIG. 4A is one of the second to $m^{th}$ connector module $CM_2$ to $CM_m$ (i.e., i is 2 to m), a cell connection wire $CW_{i-1}$ is connected to the first wire connecting member 51 protruding to the outside of the first body 50.

The first cell connecting member 52 is made of a conductor, in which a portion of the first cell connecting member is located in the first internal space of the first body 50, and the remaining portion protrudes downward to the outside of the first body 50. That is, the first cell connecting member 52 has one end exposed to the outside of the first body 50 toward a specific cell slot CS of the cell holder CH, and the other end is inserted into a first internal space of the first body 50. When a battery cell $BC_i$ is disposed in a specific cell slot CS, one end of the first cell connecting member 52 is pressed in the Z-axis direction while being in contact with the first electrode terminal of the battery cell $BC_i$ in the charge/discharge execution mode, and as a result, the externally exposed portion of the first cell connecting member 52 moves into the first internal space of the first body 50.

As illustrated in, for example, FIG. 4B, the first elastic member 53 is disposed in the first internal space of the first body 50 to be positioned between the other end of the first wire connecting member 51 and the other end of the first cell connecting member 52 and to electrically interconnect the other end of the first wire connecting member 51 and the other end of the first cell connecting member 52. For this purpose, the opposite ends of the first elastic member 53 are in direct contact with one end of the first wire connecting member 51 and the first cell connecting member 52, respectively. FIG. 4B illustrates that the first elastic member 53 is a spring, but other than the spring, any medium having elasticity of a predetermined level or higher may be used.

Referring to FIG. 4B, the first movable contact 54 is fixedly coupled to a predetermined portion of the first elastic member 53. As a result, the first movable contact 54 may also be reciprocated along the Z-axis direction in accordance with the deformation of the first elastic member 53 in the Z-axis direction.

The first fixed contact 55 is made of a conductor and has one end that is fixed to a predetermined area of the first internal space, and the other end that is exposed to the outside of the first body 50. A bypass wire $PW_i$ is connected to the portion of the first wire connecting member 51 protruding to the outside of the first body 50.

In the charge/discharge standby mode, or when a battery cell $BC_i$ is inserted into a cell slot CS, the first cell connecting member 52 and the battery cell $BC_i$ are spaced apart from each other. In this case, since a pressing force directed upward along the Z-axis does not act on the first cell connecting member 52, the first elastic member 53 is not contracted, and as illustrated in FIG. 4B, the movable contact 54 and the first fixed contact 55 are in direct contact with each other in the internal space. Accordingly, the first movable contact 54 and the first fixed contact 55 are electrically connected to each other.

Referring to FIG. 4C, in the charge/discharge execution mode, the first cell connecting member 52 is in direct contact with a first electrode terminal (e.g., the positive electrode terminal illustrated as protruding in the drawing), and as a result, the first cell connecting member 52 is moved upward along the Z-axis from its original position. In this case, because the first elastic member 53 is also contracted in the Z-axis direction, the first movable contact 54 is also moved upward along the Z-axis, and as illustrated in FIG. 4C, the first movable contact 54 is spaced apart from the first fixed contact 55. Accordingly, the first movable contact 54 and the first fixed contact 55 connected to the bypass wire $PW_i$ are electrically separated from each other.

While the first body 50 is a non-conductor, the first wire connecting member 51, the first cell connecting member 52, the first elastic member 53, the first movable contact 54, and the first fixed contact 55, are conductors.

Referring to FIGS. 3 and 4, in the charge/discharge standby mode, one of two wires $MW_1$ and $CW_{i-1}$, the first wire connecting member 51, the first elastic member 53, the first movable contact 54, the first fixed contact 55, and the bypass wire (PW) form a series connection. That is, in the charging/discharging standby mode, the first movable contact 54 and the first fixed contact 55 are in direct contact in the first internal space, and as a result, the first movable contact 54 and the first fixed contact 55 are electrically connected to each other, so that a bypass path is formed along with a connection structure which will be described later.

In addition, even in the charge/discharge execution mode, when the battery cell BC is not inserted, a series connection is formed as in the charge/discharge standby mode. For example, in the series connection, the first connector $CN_A$ serves as a bypass path to replace the non-inserted battery cell $BC_i$, and thus, enables the flow of charge/discharge current for the inserted battery cells despite the non-input battery cell BC.

In the charge/discharge execution mode, the first movable contact 54 is spaced apart from the first fixed contact 55, and accordingly, the first movable contact 54 and the first fixed contact 55 connected to the bypass wire $PW_i$ are electrically separated from each other. As a result, a series connection of one of the two wires $MW_1$ and $CW_{i-1}$, the first wire connecting member 51, the first elastic member 53, the first cell connecting member 52, and the first electrode terminal of the battery cell $BC_i$, is formed so that charge/discharge current flows through the series connection and the battery cell $BC_i$. According to an embodiment, in the charge/discharge execution mode, the bypass wire $PW_i$ becomes an open circuit, and the flow of charge/discharge current through the bypass wire $PW_i$ is blocked.

Figure 5A:
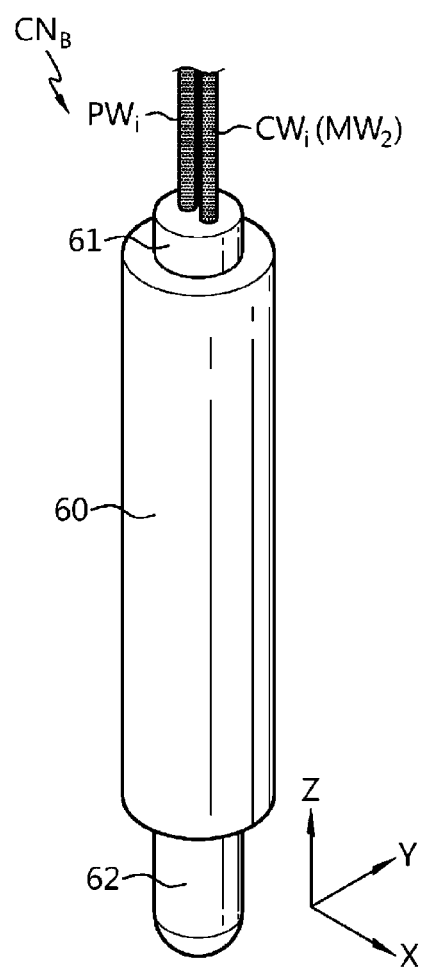
FIG. 5A is a view exemplifying the external appearance of the second connector of the connector module illustrated in FIG. 3.
Figure 5B:
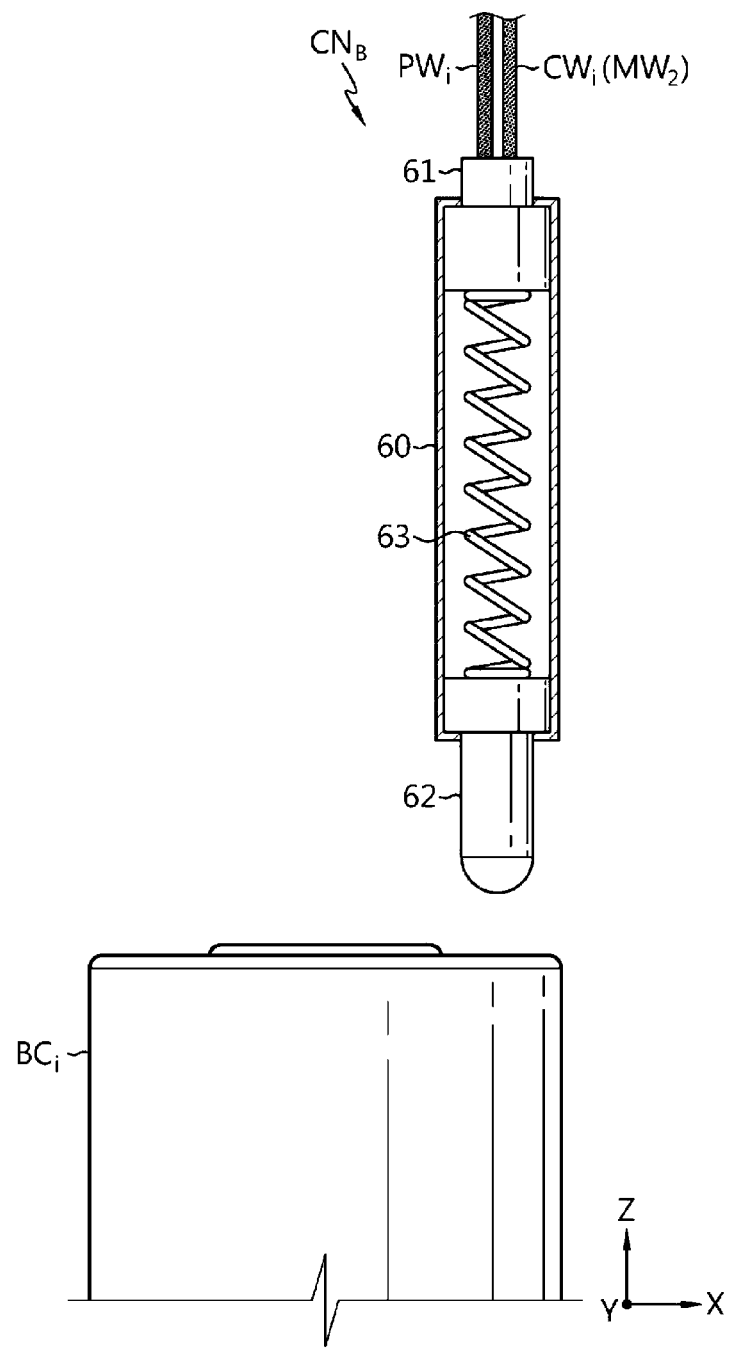
FIG. 5B is a view exemplifying the internal appearance of the second connector illustrated in FIG. 5A in the charge/discharge standby mode.
Figure 5C:
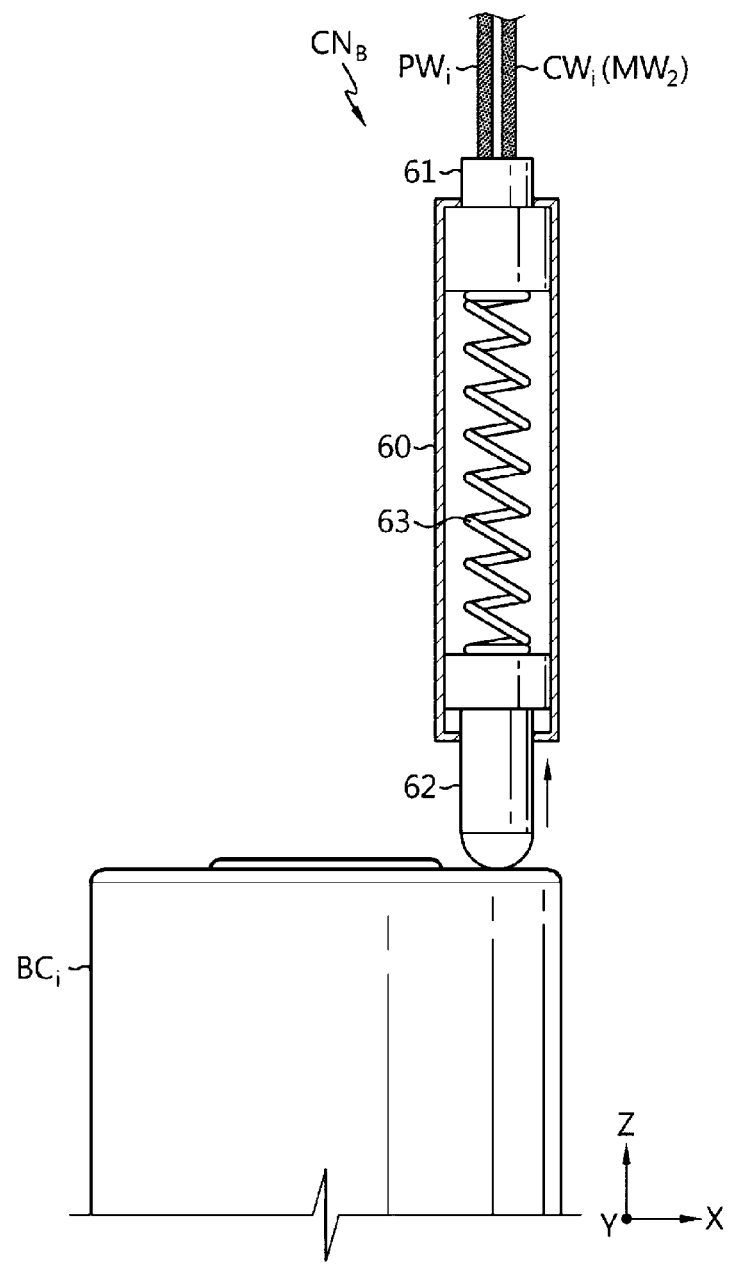
FIG. 5C is a view exemplifying the internal appearance of the second connector illustrated in FIG. 5A in the charge/discharge execution mode.

FIG. 5A is a view exemplifying the external appearance of the second connector of the connector module illustrated in FIG. 3, FIG. 5B is a view exemplifying the internal appearance of the second connector illustrated in FIG. 5A in the charge/discharge standby mode, and FIG. 5C is a view exemplifying the internal appearance of the second connector illustrated in FIG. 5A in the charge/discharge execution mode. According to an embodiment, the second connector $CN_B$ illustrated in FIGS. 5A to 5C is a Pogo Pin connector and it will be assumed that the second connector $CN_B$ belongs to the same connector module $CM_j$ as the first connector $CN_A$ illustrated in FIGS. 4A to 4C.

Referring to FIGS. 5A and 5B along with FIG. 3, the second connector $CN_B$ includes a second body 60 made of a non-conductor, a second wire connecting member 61 made of a conductor, a second cell connecting member 62 made of a conductor, and a second elastic member 63, also made of a conductor.

According to an embodiment, similar to the first body 50, the second body 60 has a circular pillar shape with opposite open ends in the Z-axis direction, and has a second internal space.

The second wire connecting member 61 is made of a conductor, in which a portion of the second wire connecting member is located in the second internal space of the first body 60, and the remaining portion protrudes to the outside through one end of the second body 60.

When the second connector $CN_B$, illustrated in FIG. 5A, is a connector that belongs to the $m^{th}$ connector module $CM_m$ (i.e., i is m), the bypass wire $PW_m$ and the second main wire $MW_2$ are connected to the portion of the second wire connecting member 61 protruding to the outside of the second body 60.

When the second connector $CN_B$ illustrated in FIG. 5A is a connector that belongs to one of the first to $(m-1)^{th}$ connector modules $CM_1$ to $CM_{m-1}$ (i.e., i is 1 to m-1), the bypass wire PW and the cell connection wire $CW_i$ are connected to the second wire connecting member 61 protruding to the outside of the second body 60.

The second cell connecting member 62 is made of a conductor, in which a portion of the second cell connecting member is located in the second internal space of the first body 60, and the remaining portion protrudes to the outside through the other end of the second body 60.

The second elastic member 63 is disposed between the second wire connecting member 61 and the second cell connecting member 62 in the second internal space of the second body 60. According to an embodiment, opposite ends of the second elastic member 63 are connected to one end of the second wire connecting member 61 and the second cell connecting member 62, respectively, so that the second wire connecting member 61 and the second cell connecting member 62 are electrically connected to each other. FIG. 5B illustrates that the second elastic member 63 is a spring, but other than the spring, any medium having elasticity of a predetermined level or higher may be used. In the charge/discharge execution mode, when the battery cell $BC_i$ is inserted into the corresponding cell slot $CS_i$ of the cell holder CH as illustrated in FIG. 5C, the second cell connecting member 62 is in direct contact with a second electrode terminal (e.g., a negative electrode terminal located next to a positive electrode terminal illustrated as protruding in the drawing). As a result, charge/discharge current will flow through a series connection of the second electrode terminal of the battery cell $BC_i$, the second cell connecting member 62, the second elastic member 63, the second wire connecting member 61, and one of the two wires $CW_i$ and $MW_2$.

Meanwhile, in the charge/discharge execution mode, when the battery cell $BC_i$ is not inserted into the corresponding cell slot $CS_i$ of the cell holder CH unlike the case in FIG. 5C, the charge/discharge current will flow through a series connection of the bypass wire $PW_i$, the second wire connecting member 61, and one of the two wires $CW_i$ and MW2, a bypass path is formed to replace the non-inserted battery cell $BC_i$ together with the first connector CAN described above.

Hereinafter, in describing the present disclosure with reference to FIGS. 6 to 8, it will be assumed that m is 5.

Figure 6:
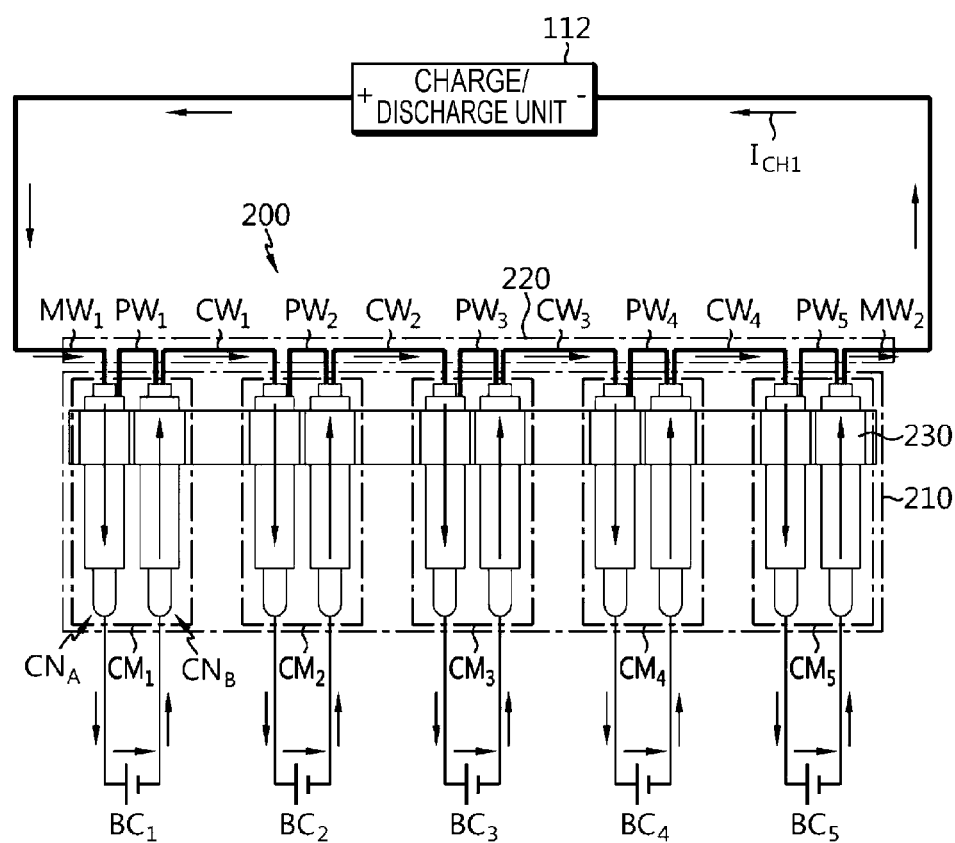
FIG. 6 is a view referenced to explain an example of a serial charge/discharge path provided by a connecting board in accordance with the cell insertion state of the cell holder.

FIG. 6 is a view referenced to explain an example of a serial charge/discharge path provided by a connector group in accordance with the cell insertion state of the cell holder CH. FIG. 6 exemplifies a serial charge/discharge path in which charge/discharge execution mode is in progress in the state where battery cells $BC_1$ to $BC_5$ are disposed in all m (m=5) cell slots CS provided in the cell holder CH.

Referring to FIG. 6, since all m cell slots CS are occupied by the battery cells $BC_1$ to $BC_5$, all battery cells $BC_1$ to $BC_5$ are electrically connected in series via a serial charge/discharge path provided by a serial connection apparatus 200. In FIG. 6, $I_{CH1}$ represents a charge current (or its path).

For example, the charge/discharge current flows through the first main wire $MW_2$, the first connector $CN_A$ of the first connector module $CM_1$, the battery cell $BC_1$, the second connector $CN_B$ of the first connector module $CM_1$, and the cell connection wire $CW_1$.

First, a charge current supplied through the first main wire $MW_1$ and the first connector $CN_A$ of the first connector module $CM_1$ will flow to the second connector $CN_B$ of the first connector module $CM_1$ via the first and second electrode terminals of the battery cell $BC_1$. In addition, the charge current will flow to the first connector CN of the second connector module $CM_2$ from the second connector ($CN_B$) of the first connector module $CM_1$. In this way, when all m cell slots CS are occupied by the battery cells $BC_1$ to $BC_5$, all bypass wires PW1 to PW5 of the serial connection apparatus 200 are maintained in an open circuit state. The discharge current flows in the reverse order to the charge current described above.

The flow of charge/discharge current due to the connection relationship between the first connector module $CM_1$ and the battery cell $BC_1$ is similarly applied to the fifth connector module $CM_5$ and battery cells $BC_2$ to $BC_5$. Accordingly, while the charge/discharge current supplied by the charge/discharge unit 112 sequentially passes through the battery cells $BC_1$ to $BC_5$, each of the battery cells $BC_1$ to $BC_5$ is charged/discharged.

Figure 7:
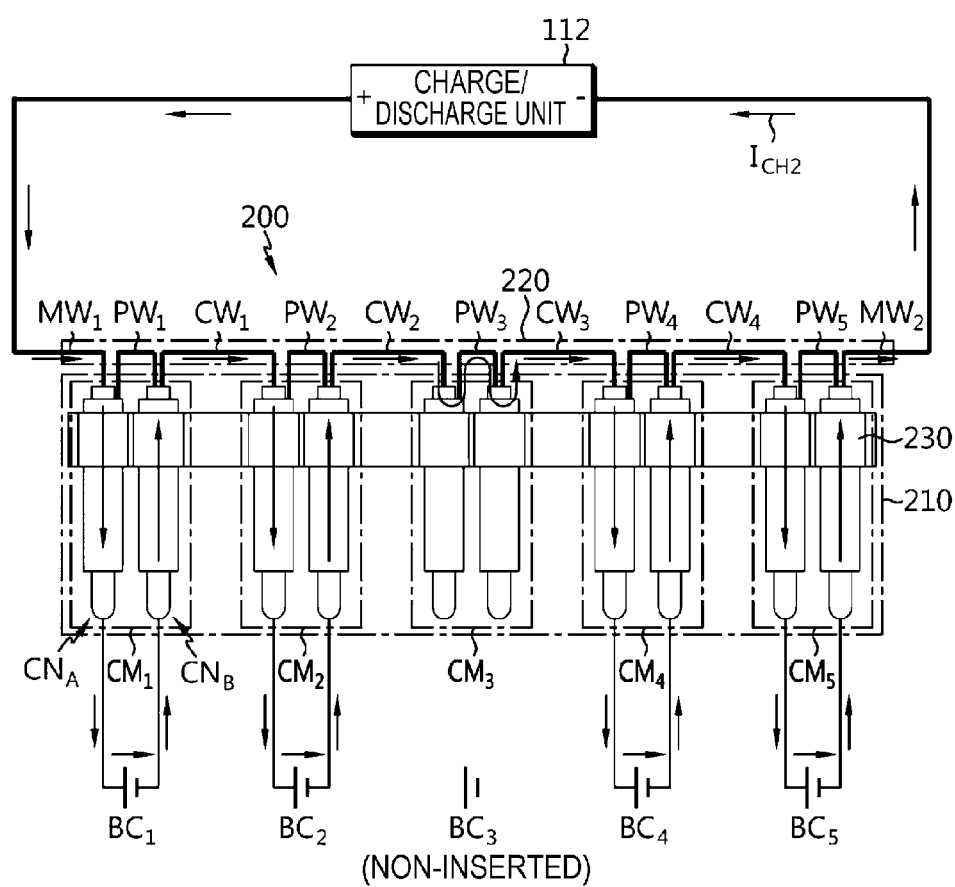
FIG. 7 is a view referenced to explain another example of a serial charge/discharge path provided by a charge/discharge board in accordance with the cell insertion state of the cell holder.

FIG. 7 is a view referenced to explain another example of a serial charge/discharge path provided by a charge/discharge board in accordance with the cell insertion state of the cell holder CH.

According to an embodiment, FIG. 7 exemplifies a serial charge/discharge path while charge/discharge execution mode is in progress in the state where the first, second, fourth, and fifth battery cells $BC_1$, $BC_2$, $BC_4$, and $BC_5$ are normally disposed in the cell holder CH, but the third battery cell $BC_3$ is not inserted. In FIG. 7, $I_{CH2}$ represents a charge current (or its path).

Referring to FIG. 7, even when the battery cell $BC_3$ is not inserted, the normally inserted battery cells $BC_1$, $BC_2$, $BC_4$, and $BC_5$ are electrically connected in series via a series charge/discharge path provided by the serial connection apparatus 200. For example, the serial connection apparatus 200 provides a charge/discharge path by automatically forming a bypass path instead of the battery cell $BC_3$, even when the battery cell $BC_3$ is not inserted. As a result, the second electrode terminal of the battery cell $BC_2$ and the first electrode terminal of the battery cell $BC_4$ are electrically connected, thereby enabling the flow of charge/discharge current, and charging/discharging of the normally inserted battery cells $BC_1$, $BC_2$, $BC_4$, and $BC_5$ becomes possible.

For example, the charge current will flow to the cell connection wire $CW_2$ via the battery cell $BC_1$ and the battery cell $BC_2$. Subsequently, like the direction of the curved arrow indicated in the third connecting module $CM_3$ portion, the cell connection wire $CW_2$ is connected to the bypass wire $PW_3$ via the first connector $CN_A$ of the third connecting module $CM_3$, and the bypass wire $PW_3$ is connected to the cell connection wire $CW_3$. Therefore, even when the battery cell $BC_3$ is not inserted, a bypass path is formed instead of the battery cell $BC_3$, and the flow of charge current from the second electrode terminal of the battery cell $BC_2$ to the first electrode terminal of the battery cell $BC_4$ is possible. A discharge current flows in the reverse order to the charge current described above.

As a result, while the charge/discharge current supplied by the charge/discharge unit 112 sequentially passes through the battery cells $BC_1$, $BC_2$, $BC_4$, and $BC_5$, each of the battery cells $BC_1$, $BC_2$, $BC_4$, and $BC_5$ is charged/discharged.

Figure 8:
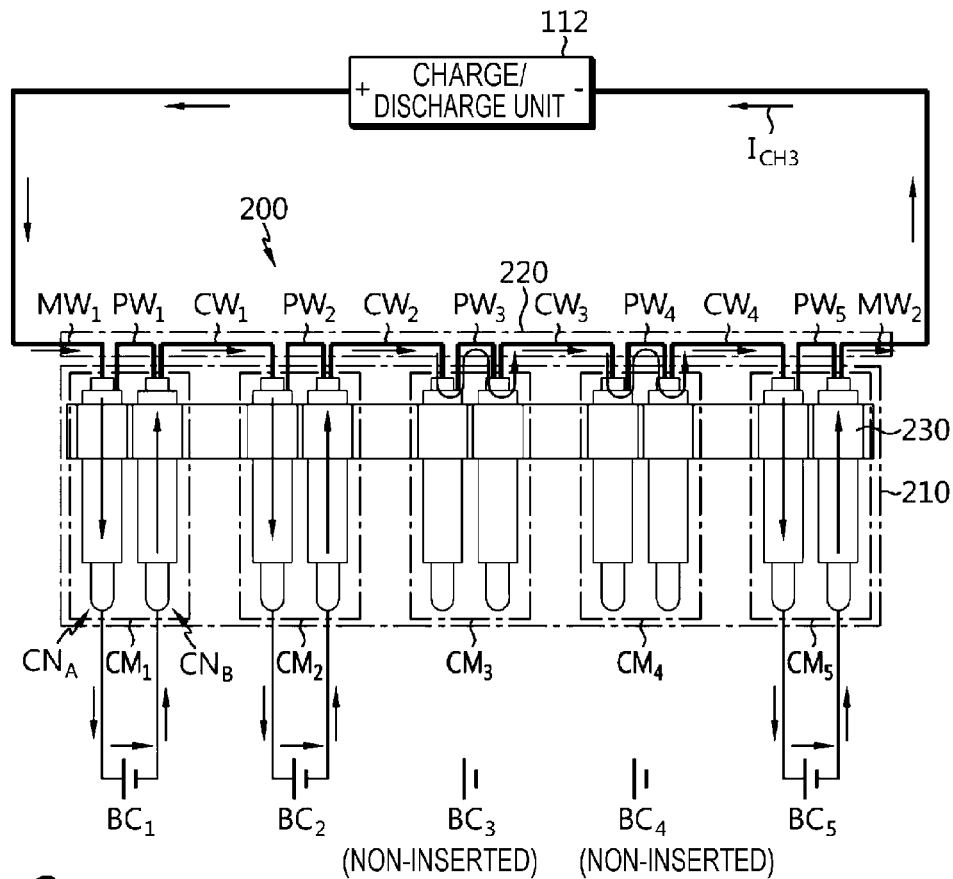
FIG. 8 is a view referenced to explain another example of a serial charge/discharge path provided by a charge/discharge board in accordance with the cell insertion state of the cell holder.

FIG. 8 is a view referenced to explain another example of a serial charge/discharge path provided by a charge/discharge board in accordance with the battery cell BC insertion state of the cell holder CH.

FIG. 8 exemplifies a serial charge/discharge path while a charge/discharge execution mode is in progress in the state where the first, second, and fifth battery cells $BC_1$, $BC_2$, and $BC_5$ are normally disposed in the cell holder CH, but the third and fourth battery cells $BC_3$, which are two electrically adjacent batteries, are not inserted. In FIG. 8, $I_{CH3}$ represents a charge current (or its path).

Referring to FIG. 8, even when the two battery cells $BC_3$ and $BC_4$ are not inserted, the normally inserted battery cells $BC_1$, $BC_2$, and $BC_5$ are automatically electrically connected in series via a series charge/discharge path provided by the serial connection apparatus 200. That is, the serial connection apparatus 200 automatically provides a charge/discharge path that bypasses the two battery cells $BC_3$ and $C_4$. As a result, since the second electrode terminal of the battery cell $BC_2$ and the first electrode terminal of the battery cell $BC_5$ are electrically connected to each other, the flow of charge current through the normally inserted battery cells $BC_1$, $BC_2$, and $BC_5$ becomes possible by the serial connection apparatus 200.

For example, as described above with reference to FIG. 7, the charge current flows to the cell connection wire $CW_2$ through the battery cell $BC_1$ and the battery cell $BC_2$. In addition, as indicated by the curved arrows on the drawing, the cell connection wire $CW_2$ is automatically electrically connected to the fifth connecting module $CM_5$ via the first connector $CN_A$ of the third connecting module $CM_3$, the bypass wire $PW_3$, the cell connection wire $CW_3$, the first connector $CN_A$ of the fourth connecting module $CM_4$, the bypass wire $PW_4$, and the cell connection wire $CW_4$. Therefore, even when the two electrically adjacent battery cells $BC_3$ and $BC_4$ are not inserted, the flow of charge current from the second electrode terminal of the normally inserted battery cell $BC_2$ to the first electrode terminal of the battery BC$_5$ is possible. A discharge current flows in the reverse order to the charge current described above.

Accordingly, similar to the case described with reference to FIG. 7, even when there are non-inserted battery cells BC$_3$, and BC$_4$, a bypass path for the non-inserted battery cells BC3 and BC4 is automatically formed without, for example, a complicated control device including a voltage sensor and a switching circuit, and while the charge/discharge current supplied by the charge/discharge unit 112 sequentially passes through the normally inserted battery cells BC$_1$, BC$_2$, and BC$_5$, each of the battery cells BC$_1$, BC$_2$, and BC$_5$ is charged/discharged.

Figure 9:
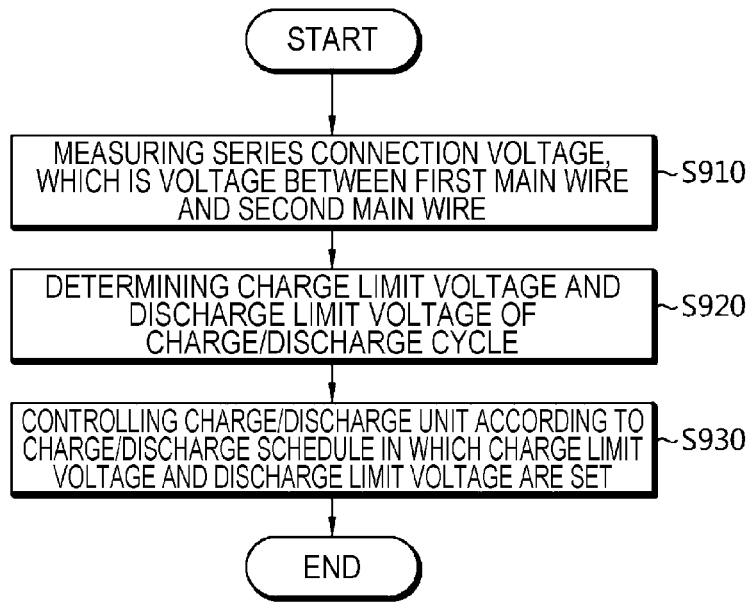
FIG. 9 is a flowchart illustrating a battery charge/discharge control method according to another embodiment of the present disclosure.

FIG. 9 is a flowchart illustrating a battery charge/discharge control method according to another embodiment of the present disclosure. According to an embodiment, the charge/discharge control method of FIG. 9 may be executed at the time of initiating a charge/discharge execution mode. It is assumed that the operation of the charge/discharge unit 112 is stopped when the charge/discharge execution mode is initiated.

Referring to FIGS. 1 to 9, in step S910, the charge/discharge controller 120 measures the series connection voltage, which is the voltage between the first main wire MW$_1$ and the second main wire MW$_2$. The series connection voltage is the voltage across the serial circuit of battery cells disposed in the occupied cell slots CS among all the cell slots CS of the cell holder CH, and has a positive correlation with the number of cells BC inserted into the cell holder CH.

In step S920, the charge/discharge controller 120 determines a charge limit voltage and a discharge limit voltage of a charge/discharge cycle based on the series connection voltage measured in step S910.

According to an embodiment, the charge/discharge controller 120 estimates the number of battery cells BC inserted into the cell holder CH by dividing the series connection voltage by a predetermined reference cell voltage. Next, the charge/discharge controller 120 obtains a charge limit voltage associated with the estimated number of battery cells BC from a first lookup table which is recorded in the memory 124 and defines the charge limit voltage according to the number of cells. In addition, the charge/discharge controller 120 obtains a discharge limit voltage associated with the estimated number of battery cells BC from a second lookup table, which is recorded in the memory 124 and defines the discharge limit voltage according to the number of cells. Meanwhile, the charge limit voltage and discharge limit voltage may also be obtained by methods other than each of the lookup tables, such as user input via a wired or wireless manner.

In step S930, the charge/discharge controller 120 controls the charge/discharge unit 112 according to a charge/discharge schedule in which the charge limit voltage and discharge limit voltage determined in step S920 are set. According to an embodiment, the charge/discharge schedule may be pre-stored in the memory 124 or may be input from the outside using wired or wireless communication.

In detail, when the charge/discharge cycle according to the charge/discharge schedule proceeds, the charge limit voltage and discharge limit voltage set in step S920 are used. As an example, as described above, when a battery formation process proceeds in the order of a first charge stage, a first pause stage, a discharge stage, a second pause stage, and a second charge stage, the charge/discharge controller 120 stops the charge function of the charge/discharge unit 112 and activates the pause function in response to the series connection voltage reaching the charge limit voltage in each of the first charge stage and the second pause stage. In addition, the charge/discharge controller 120 stops the discharge function of the charge/discharge unit 112 and activates the pause function in response to the voltage across the series connection in the discharge stage reaching the discharge limit voltage.

The above-described embodiments of the present disclosure are not only implemented through apparatuses and methods, but may also be implemented through a program that implements the functions corresponding to the configuration of the embodiment of the present disclosure or a recording medium recorded with the program. This may be easily implemented by a person ordinarily skilled in the technical field to which the present disclosure belongs based on the description of the embodiments described above.

While the present disclosure has been described above with reference to several embodiments thereof, the present disclosure is not limited by the embodiments, and various changes and modifications can be made by a person ordinarily skilled in the art to which the present disclosure pertains without departing from the technical spirit and equivalent scope of the present disclosure defined by the appended claims.

In addition, since various substitutions, modifications, and changes can be made on the present disclosure described above without departing from the technical spirit of the present disclosure by a person ordinarily skilled in the art to which the present disclosure pertains, the present disclosure is not limited by the above-described embodiments and the accompanying drawings, but all or some of respective embodiments can be selectively combined such that various modifications can be made.

What is claimed is:

1. A serial connection apparatus comprising:
   a connector group including first to m$^{th}$ connector modules (m is a natural number of 2 or more) provided on a one-to-one basis to first to m$^{th}$ cell slots provided in a cell holder, wherein each of the first to m$^{th}$ connector modules includes a first connector and a second connector; and
   a wire bundle electrically connected to the first to m$^{th}$ connector modules,
   wherein the first connector of the first connector module is configured to be electrically connected to a first power terminal of a charge/discharge unit,
   wherein the second connector of the m$^{th}$ connector module is configured to be electrically connected to a second power terminal of the charge/discharge unit,
   wherein the second connector of a j$^{th}$ connector module (j is a natural number less than m) is configured to be electrically connected to the first connector of a (j+1)$^{th}$ connector module via the wire bundle,
   wherein, when an i$^{th}$ cell slot (i is a natural number of m or less) is in an empty state without a battery cell disposed therein, the first connector of an i$^{th}$ connector module is configured to be electrically connected to the second connector of the i$^{th}$ connector module via the wire bundle, and
   wherein, when the i$^{th}$ cell slot is in an occupied state with a battery cell disposed therein, the first connector of the i$^{th}$ connector module is configured to be electrically connected to the first electrode terminal of the battery cell disposed in the i$^{th}$ cell slot, and the second connector of the i$^{th}$ connector module is configured to be electrically connected to the second electrode terminal of the battery cell disposed in the i$^{th}$ cell slot.

2. The serial connection apparatus according to claim 1, wherein the first connector of the $i^{th}$ connector module includes:
a first body having a first internal space;
a first wire connecting member having one end that is inserted into the first internal space and another end that is exposed outside the first body;
a first cell connecting member having one end that is exposed outside the first body toward the cell holder and the other end that is inserted into the first internal space;
a first elastic member disposed in the first internal space to be positioned between the first wire connecting member and the first cell connecting member;
a first movable contact coupled to the first elastic member so as to be movable along an axial direction of the first internal space in accordance with deformation of the first elastic member; and
a first fixed contact having one end that is fixed to a predetermined area of the first internal space and the other end that is exposed outside the first body,
wherein the first body is a non-conductor, and
wherein each of the first cell connecting member, the first fixed contact, the first elastic member, and the first movable contact is conductor.

3. The serial connection apparatus according to claim 2, wherein the other end of the first wire connecting member of the first connector of the first connector module is connected to the first power terminal of the charge/discharge unit, and
wherein the other end of the first wire connecting member of the second connector of the $j^{th}$ connector module is connected to the other end of the first wire connecting member of the first connector of the $(j+1)^{th}$ connector module via the wire bundle.

4. The serial connection apparatus according to claim 2, wherein, when a $j^{th}$ cell slot is in the empty state,
the first movable contact of the first connector of the $j^{th}$ connector module is configured to be brought into a physical contact with the first fixed contact by the first elastic member to be electrically connected to the first fixed contact of the first connector of the $j^{th}$ connector module, and
the first fixed contact of the first connector of the $j^{th}$ connector module is configured to be electrically connected to the first wire connecting member of the first connector of the $(j+1)^{th}$ connector module via the wire bundle, and
wherein, when the $m^{th}$ cell slot is in the empty state,
the first movable contact of the first connector of the $m^{th}$ connector module is configured to be brought into physical contact with the first fixed contact by the first elastic member to be electrically connected to the first fixed contact of the first connector of the $m^{th}$ connector module, and
the first fixed contact of the first connector of the $m^{th}$ connector module is configured to be electrically connected to the second power terminal of the charge/discharge unit via the wire bundle.

5. The serial connection apparatus according to claim 2, wherein when the $i^{th}$ cell slot is in the occupied state,
the first cell connecting member of the first connector of the $i^{th}$ connector module is configured to come into a physical contact with the first electrode terminal of the battery cell disposed in the $i^{th}$ cell slot to be electrically connected to the first electrode terminal of the battery cell, and the first movable contact of the first connector of the $i^{th}$ connector module is configured to be physically spaced apart from the first fixed contact in accordance with the deformation of the first elastic member to be electrically separated from the first fixed contact of the first connector of the $i^{th}$ connector module.

6. The serial connection apparatus according to claim 2, wherein the second connector of the $i^{th}$ connector module includes:
a second body having a second internal space formed therein;
a second wire connecting member having one end that is inserted into the second internal space and the other end that is exposed outside the second body;
a second cell connecting member having one end that is exposed outside the second body toward the cell holder and another end that is inserted into the second internal space; and
a second elastic member disposed in the second internal space to be positioned between the second wire connecting member and the second cell connecting member,
wherein the second body is a non-conductor, and
wherein each of the second wire connecting member, the second cell connecting member, and the second elastic member is conductor.

7. The serial connection apparatus according to claim 6, wherein the second wire connecting member of the second connector of the $j^{th}$ connector module is connected to the first fixed contact of the first connector of the $j^{th}$ connector module and the first wire connecting member of the first connector of the $(j+1)^{th}$ connector module via the wire bundle, and
wherein the second wire connecting member of the second connector of the $m^{th}$ connector module is connected to the first fixed contact of the first connector of the $m^{th}$ connector module and the second power terminal of the charge/discharge unit via the wire bundle.

8. The serial connection apparatus according to claim 6, wherein, when the $i^{th}$ cell slot is in the occupied state, the second cell connecting member of the second connector of the $i^{th}$ connector module comes into physical contact with the second electrode terminal of the battery cell disposed in the $i^{th}$ cell slot to be electrically connected to the second electrode terminal of the battery cell disposed in the $i^{th}$ cell slot.

9. The serial connection apparatus according to claim 6, wherein the wire bundle includes:
first to $m^{th}$ bypass wires; and
first to $(m-1)^{th}$ cell connection wires,
wherein an $i^{th}$ bypass wire electrically interconnects the first wire connecting member of the first connector of the $i^{th}$ connector module and the second wire connecting member of the second connector of the $i^{th}$ connector module, and
wherein an $i^{th}$ cell connection wire electrically connects the second wire connecting member of the second connector of the $i^{th}$ connector module to the first wire connecting member of the first connector of the $(i+1)^{th}$ connector module.

10. A battery charge/discharge system comprising the serial connection apparatus according to claim 1.

11. A serial connection apparatus comprising:
a plurality of connector modules corresponding one-to-one to a plurality of cell slots included in a cell holder, wherein each of the plurality of connector modules includes a connector group including a first connector and a second connector, wherein, among the plurality of connector modules, the first connector and the second connector of each connector module corresponding to an empty cell slot into which a battery cell is not inserted are configured to be electrically connected to each other to form a bypass path automatically, and wherein, among the plurality of connector modules, the first connector and the second connector of each connector module corresponding to an occupied cell slot into which a battery cell is inserted are configured to be individually connected to the first electrode and the second connector of the battery cell inserted into the occupied cell slot to provide a serial charge/discharge path.

12. The serial connection apparatus according to claim 11, wherein the first connector includes a first body, a first wire connecting member, a first cell connecting member, a first elastic member, a first movable contact, and a first fixed contact, and wherein the first body is made of a non-conductor, has a circular pillar shape with opposite open ends in a Z-axis direction, and includes a first internal space.

13. The serial connection apparatus according to claim 12, wherein the first wire connecting member has a portion located in the first internal space of the first body, and a remaining portion protruding outside through one end of the first body, and wherein the first cell connecting member has a portion located in the first internal space of the first body, and a remaining portion exposed outside the first body toward a predetermined cell slot of the cell holder disposed in a lower side thereof.

14. The serial connection apparatus according to claim 13, wherein the first elastic member is disposed in the first internal space to be positioned between the other end of the first wire connecting member and the other end of the first cell connecting member such that the other end of the first wire connecting member and the other end of the first cell connecting member are electrically connected to each other, and wherein the first movable contact is fixedly coupled to a predetermined portion of the first elastic member, and also reciprocates along the Z-axis direction in accordance with deformation of the first elastic member in the Z-axis direction.

15. The serial connection apparatus according to claim 14, wherein the first fixed contact is made of a conductor and has one end fixed to a predetermined area of the first internal space and the other end exposed outside the first body, and a bypass wire is connected to the first wire connecting member protruding outside the first body.

16. The serial connection apparatus according to claim 15, wherein the first movable contact is connected to the first fixed contact at the predetermined portion, and as the first elastic member is deformed in the Z-axis direction in response to movement of the first cell connecting member in the Z-axis direction, the first movable contact also reciprocates in the Z-axis direction to be separated from the first fixed contact.

17. A battery charge/discharge system comprising the serial connection apparatus according to claim 11.

* * * * *